United States Patent
Takeda et al.

[11] 3,840,776
[45] Oct. 8, 1974

[54] VARIABLE INTENSITY ILLUMINATION CONTROL SYSTEM FOR A MOTOR VEHICLE

[75] Inventors: Tomohiro Takeda, Atsugi; Takaaki Mogi, Fujisawa, both of Japan

[73] Assignees: Nissan Motor Company, Limited, Yokohama; Ichikoh Industries Limited, Tokyo, both of, Japan

[22] Filed: May 29, 1973

[21] Appl. No.: 364,330

[52] U.S. Cl. ............ 315/69, 315/77, 315/82, 340/74
[51] Int. Cl. ............................ B60q 1/26
[58] Field of Search ............ 315/77, 82, 64, 67, 69; 340/74, 76; 307/10 LS

[56] References Cited
UNITED STATES PATENTS
3,548,251  12/1970  Carbary .................. 315/77

*Primary Examiner*—H. K. Saalbach
*Assistant Examiner*—James B. Mullins

[57] ABSTRACT

A system comprising a bulb having a filament for providing illumination and a filament responsive to and indicating a warning condition such as braking, means to automatically reduce the intensity of illumination of the warning filament when the illumination filament is energized, and means to manually vary the intensity of illumination of the illumination filament.

4 Claims, 1 Drawing Figure

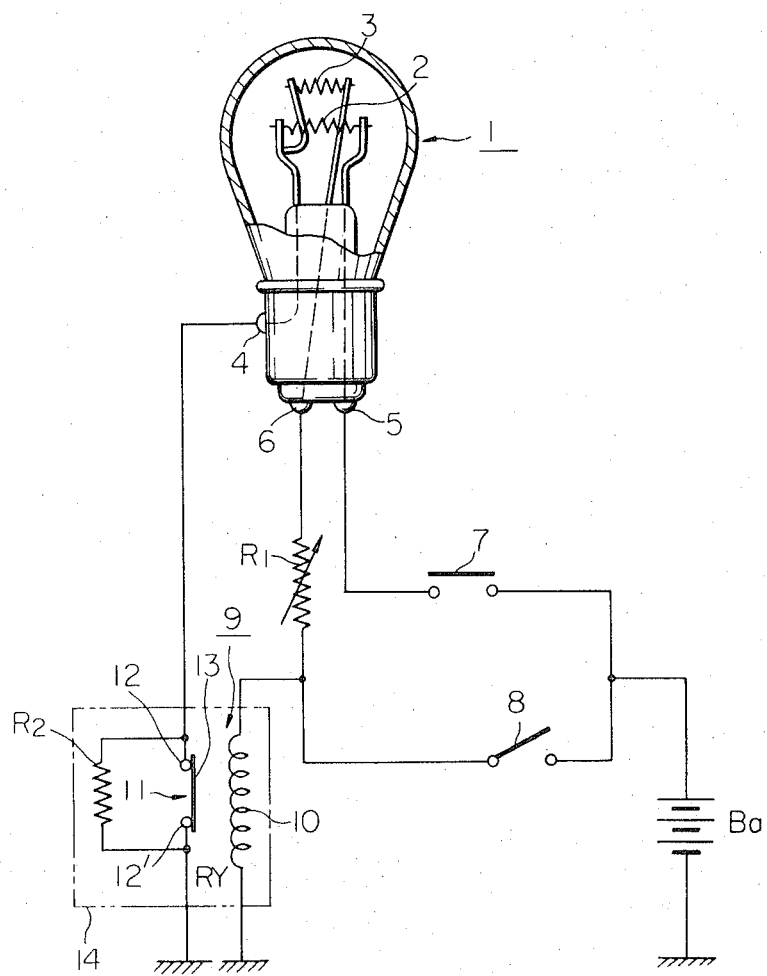

VARIABLE INTENSITY ILLUMINATION CONTROL SYSTEM FOR A MOTOR VEHICLE

The present invention relates generally to a motor vehicle illumination system which is provided with a dual filament lamp bulb and, more particularly, to a variable intensity illumination control system for a motor vehicle which is capable of controlling the luminous intensities of warning and operating or lighting lamps in the dual filament lamp bulb under daylight or nighttime driving conditions.

Motor vehicles for highway use are commonly provided with operating or lighting lamps such as headlamps, tail lamps and parking lamps. In addition, they are ordinarily equipped with warning lamps such as brake or stop lamps, turn signal lamps and pilot lamps.

Because of the necessity of providing sufficient brilliance to command attention during daylight driving conditions, the warning and lighting lamps presently used on motor vehicles are often too bright and cause objectionable glare under twilight or nighttime driving conditions. In order to avoid this drawback, it may be arranged that different daytime and nighttime luminous intensities are imparted to such warning and lighting lamps. Numerous vehicle illumination systems therefore have been suggested which employ dimming resistors employed in series with the lamps to be dimmed and additional switching means such as electromagnetic relays for shunting or short-circuiting the dimming resistors when the lamps are to be operated at full intensity.

In the prior art vehicle illumination systems, the additional switching means for short-circuiting the dimming resistors is usually inserted between the lamps and the lamp switches, i.e., at the side relative to the lamps of an electric power source such as a vehicle storage battery mounted on the vehicle body. With this arrangement, however, there is a possibility of electric wires or connectors for interconnecting electric elements or components in the system being cut or disconnecting from the components due to shocks or jerks occuring during operation of the motor vehicle, so that the disconnected wires or connectors are likely to make contact with the vehicle body, resulting in the short-circuiting of the electric power circuit and the emission of spark discharges which might cause a fire.

In addition, in prior art vehicle illumination systems, a number of warning and lighting lamps as mentioned above are usually located at the forward end or rear end of the vehicle separately from and independently of one another, that is to say, each having its own function. This results in the condition that the drivers of approaching vehicles can not readily distinguish one lamp from another, and that all of such numerous lamps can not be installed in compact cars.

Thus, the prior art vehicle illumination systems are inadequate and a serious problem remains to be solved, so that there is a pressing need for an improved vehicle illumination system.

In accordance with the present invention, the disadvantages associated with prior art vehicle illumination systems have been overcome by providing an improved vehicle illumination system, i.e., an improved variable intensity illumination control system for a motor vehicle comprising a switching means such as an electromagnetic relay which shunts a resistor for dimming the warning lamps when the lamps are to be operated at full intensity, and is inserted in the ground connection circuit of the lamps, i.e., at the opposite side relative to the lamps of the electric power source, and an adjustable resistor for adjusting the value of resistance of the illumination circuit. The adjustable resistor has a value of resistance higher than that of the dimming resistor.

Further, in accordance with the present invention an improved variable intensity illumination control system employs a dual filament lamp bulb which has a high beam filament serving as a warning lamp and a low beam filament serving as a lighting lamp in order to enable one bulb to perform two functions.

It is, therefore, a primary object of the present invention to provide an improved vehicle illumination system overcoming the above-mentioned problems of the prior art.

Another object of the present invention is to provide an improved variable intensity illumination control system for a motor vehicle which is capable of controlling the luminous intensities of warning and operating or lighting lamps under daylight or nighttime driving conditions.

Still another object of the present invention is to provide an improved variable intensity illumination control system for a motor vehicle which has a dual filament lamp bulb including therein the filaments of both the warning and lighting lamps.

A further object of the present invention is to provide an improved variable intensity illumination control system for a motor vehicle which operates safely and reliably.

Still a further object of the present invention is to provide an improved variable intensity illumination control system for a motor vehicle which is simple in construction and economical to manufacture.

A better understanding of the present invention may be had from the detailed description which follows taken with the single drawing which is a schematic representation of a variable intensity illumination control system in accordance with a preferred embodiment of the present invention.

Referring now to the drawing, there is illustrated a variable intensity illumination control system for a motor vehicle of the present invention which is provided with a dual filament lamp bulb generally designated by a numeral 1 including therein two filaments of a double transverse type, i.e., a selectively energizable high beam filament 2 and low beam filament 3. The dual filament lamp bulb 1 has a common terminal or contact 4 connected to both filaments 2 and 3, a high beam filament contact 5 and a low beam filament contact 6. The high beam filament 2 serves as a filament of a warning lamp such as a brake or stop lamp, turn signal lamp, pilot lamp or the like, while the low beam filament 3 serves as a filament of an operating or lighting lamp such as a headlamp, tail lamp, parking lamp or the like. For the sake of simplicity of description, the high beam filament 2 will be hereinafter referred to as a filament of the stop lamp (e.g., being of 23 watt rating) and the low beam filament 3 as a filament of the tail lamp (e.g., being of 8 watt rating). The stop lamp filament 2 is connected through a warning lamp switch, i.e., a stop lamp switch 7 to an electric power source such as a vehicle storage battery Ba mounted on the vehicle body. On the other hand, the tail lamp filament 3 is connected through a lighting lamp switch, i.e., a tail lamp switch 8 to the battery B$a$. Between the stop lamp filament contact 6 and the tail lamp switch 8 is further connected an adjustable resistor $R_1$ having a value of resistance of $r_1$.

Serially connected between the common contact 4 of the bulb 1 and a ground terminal of the system (no numeral) is a dimming resistor $R_2$ having a value of resistance of $r_2$ which is lower than that of the adjustable resistor $R_1$; that is, there is such a relationship between them that $r_1 > r_2$. The dimming resistor $R_2$ is arranged to be shunted by a switching means generally indicated by numeral 9 including an electromagnetic relay RY of a normally-closed type. The relay RY comprises a relay coil 10 having one terminal connected to a junction between the adjustable resistor $R_1$ and the tail lamp switch 8 and the other terminal grounded, and a normally-closed relay contact assembly 11 shunting the dimming resistor $R_2$. The contact assembly 11 comprises two stationary contacts 12 and 12', and a movable contact 13 operable to connect and disconnect the stationary contacts 12 and 12' therebetween, that is, operable to short-circuit the dimming resistor $R_2$ when the filament 2 is to be operated at full intensity. In this instance, it is to be appreciated that the dimming resistor $R_2$ and the switching means 9 are inserted in the ground connection circuit of the bulb 1, i.e., at the side relative to the bulb 1 opposite to the vehicle storage battery B$a$. Further, it is to be appreciated that the dimming resistor $R_2$ and the switching means 9 may be incorporated with each other into a unit 14, as illustrated in broken line in the drawing. Furthermore, the adjustable resistor $R_1$ may be also incorporated into the unit 14. Accordingly, it may be easy to perform the wiring of the elements or components in this system, as mentioned above.

When, in operation, the tail lamp switch 8 is switched off under daylight driving conditions which de-energizes the coil 10 of the relay RY, the movable contact 13 of the relay RY is in a closed circuit position, resulting in the dimming resistor $R_2$ being short-circuited by the movable contact 13. At this time, an electric stop lamp circuit consists of the movable contact 13, the stop lamp filament 2 in the bulb 1, the stop lamp switch 7, the battery B$a$ and the ground connections. Under these conditions, in the event the stop lamp switch 7 is closed during operation of the motor vehicle, an electric closed stop lamp circuit is completed in this system so that a substantially full source voltage of the battery B$a$ is applied to the stop lamp filament 2. Then, the stop lamp filament 2 may emit light of a high luminous intensity or may be of full brilliance so that the drivers of vehicles approaching from behind will be able to perceive the stop lamp signal.

On the other hand, when the tail lamp switch 8 is switched on under nighttime driving conditions thus energizing the relay coil 10, the movable contact 13 is moved to an open circuit position, resulting in the resistance of the dimming resistor $R_2$ being interposed between the common contact 4 of the bulb 1 ground. That is to say, at this time, an electric tail lamp circuit is completed through the dimming resistor $R_2$, the tail lamp filament 3, the adjustable resistor $R_1$, the tail lamp switch 8, the battery B$a$ and the ground connections. Under these conditions, in the event the stop lamp switch 7 is closed during operation of the motor vehicle, the stop lamp filament 2 may emit light of a desirable low luminous intensity or may be of reduced brilliance due to a voltage drop across the dimming resistor $R_2$. At the same time, the tail lamp filament 3 will emit light of a desirable low luminous intensity determined by the total resistance of the adjustable resistor $R_1$ (manually operated), and the dimming resistor $R_2$, because of a voltage drop developed across these elements, resulting in objectionable glare under twilight or nighttime driving conditions being prevented. It will be appreciated that, under these nighttime driving conditions, the luminous intensity of the stop lamp filament 2 is higher than that of the tail lamp filament 3, because the voltage applied to the stop lamp filament 2 is higher than that applied to the tail lamp filament 3, since the voltage drop developed in the closed stop lamp circuit including only the dimming resistor $R_2$ is less than that in the closed tail lamp circuit including not only the dimming resistor $R_2$ but also the adjustable resistor $R_1$. In this regard, where the load current of the stop lamp filament 2 is $I_2$ while the load current of the tail lamp filament 3 is $I_3$, there is a relationship between them such that $I_2 > I_3$, so that the voltage drop developed across the resistors $R_1$ and $R_2$ combined in the closed tail lamp circuit may be represented by $I_3 \times (r_1 + r_2)$. Thus, a proper voltage may be applied to the tail lamp filament 3 due to the voltage drop, i.e., $I_3 \times (r_1 + r_2)$, resulting in the tail lamp filament 3 emitting light of a desirable luminous intensity under nighttime driving conditions. Unless the adjustable resistor $R_1$ is inserted into the circuit of the system, there arises an insufficient voltage drop, i.e., it may be represented by $I_3 \times r_2$ in the closed tail lamp circuit, resulting in the tail lamp filament 3 emitting light of too high a luminous intensity and causing objectionable glare under twilight or nighttime driving conditions.

There is thus provided a simple, efficient and inexpensive variable intensity illumination control system for a motor vehicle of the present invention in which objectionable nighttime glare from warning and lighting lamps of a vehicle is eliminated and yet affords sufficient brilliancy therefrom during daylight driving conditions.

It should be understood that the above-described arrangement is illustrative of the application of the principle of the present invention and that other arrangements and modifications may be devised by those skilled in the art without departing from the scope thereof.

What is claimed is:

1. A variable intensity illumination control system for a motor vehicle comprising:
    an electric power source;
    a dual filament lamp bulb which includes a high beam warning lamp filament having one terminal connected through a warning lamp switch to said power source and a low beam operating lamp filament having one terminal connected through an adjustable resistor and an operating lamp switch to said power source, the other terminals of said filaments being connected with each other;
    a dimming resistor having one terminal connected to said other terminals of said filaments and the other terminal grounded; and
    a switching means shunting said dimming resistor operable in response to closing said operating lamp switch to short-circuit said dimming resistor.

2. A variable intensity illumination control system as claimed in claim 1, in which said high beam warning lamp filament serves as at least one of a stop lamp, turn signal lamp and pilot lamp, and said low beam operating lamp filament serves as at least one of a headlamp, tail lamp and parking lamp.

3. A variable intensity illumination control system as claimed in claim 1, in which said switching means is a normally-closed relay comprising a relay coil having one terminal connected to a junction between said adjustable resistor and said operating lamp switch and the other terminal grounded, and a relay contact assembly movable from a closed position in which it shunts said dimming resistor to an open position when said relay is energized in response to closing of said operating lamp switch.

4. A variable intensity illumination control system as claimed in claim 1, in which said dimming resistor has a value of resistance less than that of said adjustable resistor.

* * * * *